(12) United States Patent
Kim et al.

(10) Patent No.: US 12,217,547 B2
(45) Date of Patent: Feb. 4, 2025

(54) METHOD FOR UPDATING FINGERPRINT INFORMATION AND ELECTRONIC DEVICE FOR SUPPORTING THE SAME

(71) Applicant: Samsung Electronics Co., Ltd., Suwon-si (KR)

(72) Inventors: Suna Kim, Suwon-si (KR); Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/501,543

(22) Filed: Nov. 3, 2023

(65) Prior Publication Data

US 2024/0161548 A1 May 16, 2024

Related U.S. Application Data

(63) Continuation of application No. PCT/KR2023/017128, filed on Oct. 31, 2023.

(30) Foreign Application Priority Data

Nov. 10, 2022 (KR) .................. 10-2022-0149136
Nov. 29, 2022 (KR) .................. 10-2022-0163231

(51) Int. Cl.
*G06K 9/00* (2022.01)
*G06F 21/32* (2013.01)
(Continued)

(52) U.S. Cl.
CPC .............. *G06V 40/50* (2022.01); *G06F 21/32* (2013.01); *G06F 21/44* (2013.01); *G06V 10/993* (2022.01);
(Continued)

(58) Field of Classification Search
CPC ............... G06V 40/50; G06V 40/1306; G06V 40/1371; G06V 10/993; G06V 40/1329;
(Continued)

(56) References Cited

U.S. PATENT DOCUMENTS 11,393,246 B2   7/2022  Lee et al.
11,514,711 B2  11/2022  Yang
(Continued)

FOREIGN PATENT DOCUMENTS

CN    112115917 A    12/2020
EP   3 252 639 A1    12/2017
(Continued)

OTHER PUBLICATIONS

International Search Report dated Jan. 29, 2024, issued in International Application No. PCT/KR2023/017128.

*Primary Examiner* — Abdul-Samad A Adediran
(74) *Attorney, Agent, or Firm* — Jefferson IP Law, LLP

(57) ABSTRACT

In an embodiment, an electronic device may include a fingerprint sensor, a display module including a touch sensor, and at least one processor operatively connected to the fingerprint sensor and the display module. The at least one processor may be configured to obtain a first touch input of a user to the display module through the touch sensor. The at least one processor may be configured to perform authentication for the user based on a fingerprint image and registered fingerprint information, the fingerprint image being obtained through the fingerprint sensor when the first touch input is obtained. The at least one processor may be configured to identify, based on the authentication for the user being successful, whether the fingerprint image satisfies a first condition for updating the registered fingerprint information. The at least one processor may be configured to identify whether an intensity of the first touch input is greater than or equal to a threshold intensity set for deter-
(Continued)

mining whether a touch input to the display module is inputted by the user's finger that is not in contact with a foreign material. The at least one processor is configured to update the registered fingerprint information using the fingerprint image based on identifying that the fingerprint image satisfies the first condition and that the intensity of the first touch input is equal to or greater than the threshold intensity.

20 Claims, 10 Drawing Sheets

(51) Int. Cl.
- *G06F 21/44* (2013.01)
- *G06V 10/98* (2022.01)
- *G06V 40/12* (2022.01)
- *G06V 40/13* (2022.01)
- *G06V 40/50* (2022.01)

(52) U.S. Cl.
CPC ...... *G06V 40/1306* (2022.01); *G06V 40/1371* (2022.01); *G06F 2221/2117* (2013.01)

(58) Field of Classification Search
CPC ..... G06V 40/1365; G06F 21/32; G06F 21/44; G06F 2221/2117; H04L 63/0861
See application file for complete search history.

(56) References Cited

U.S. PATENT DOCUMENTS

| | | |
|---|---|---|
| 2015/0131876 A1 | 5/2015 | Chang |
| 2016/0171281 A1 | 6/2016 | Park et al. |
| 2016/0253544 A1 | 9/2016 | Weber et al. |
| 2017/0032168 A1* | 2/2017 | Kim .................... H04L 63/0861 |
| 2018/0025202 A1 | 1/2018 | Ryshtun et al. |
| 2018/0173922 A1 | 6/2018 | Ghavanini et al. |
| 2018/0365465 A1 | 12/2018 | Kim et al. |
| 2019/0228203 A1* | 7/2019 | Kim .................... G06V 40/1329 |
| 2019/0251329 A1* | 8/2019 | Jiang .................. G06V 40/1365 |
| 2020/0356754 A1 | 11/2020 | Chen et al. |
| 2021/0064207 A1 | 3/2021 | Kim et al. |
| 2022/0164563 A1 | 5/2022 | Lee et al. |
| 2022/0262161 A1 | 8/2022 | Zhao et al. |

FOREIGN PATENT DOCUMENTS

| | | |
|---|---|---|
| KR | 10-2017-0123611 A | 11/2017 |
| KR | 10-2017-0136692 A | 12/2017 |
| KR | 10-2018-0137830 A | 12/2018 |
| KR | 10-2019-0088679 A | 7/2019 |
| KR | 10-2019-0111623 A | 10/2019 |
| KR | 10-2313568 B1 | 10/2021 |
| WO | 2019/132207 A1 | 7/2019 |
| WO | 2020/024117 A1 | 2/2020 |

\* cited by examiner

METHOD FOR UPDATING FINGERPRINT INFORMATION AND ELECTRONIC DEVICE FOR SUPPORTING THE SAME

CROSS-REFERENCE TO RELATED APPLICATION(S)

This application is a continuation application, claiming priority under § 365(c), of an International application No. PCT/KR2023/017128, filed on Oct. 31, 2023, which is based on and claims the benefit of a Korean patent application number 10-2022-0149136, filed on Nov. 10, 2022, in the Korean Intellectual Property Office, and of a Korean patent application number 10-2022-0163231, filed on Nov. 29, 2022, in the Korean Intellectual Property Office, the disclosure of each of which is incorporated by reference herein in its entirety.

TECHNICAL FIELD

The disclosure relates to a method for updating fingerprint information and an electronic device supporting the same.

BACKGROUND ART

Various biometric authentication technologies may be applied to an electronic device. Among various biometric authentication technologies, the most commonly used biometric authentication technology may be a fingerprint authentication technology. The electronic device may comprise a display module (e.g., a touch screen) capable of detecting a touch inputted by a finger or the like. The electronic device may obtain a fingerprint of a finger using a fingerprint sensor disposed at a location corresponding to at least a partial region of the display module of the electronic device.

The electronic device may perform various functions using fingerprint authentication. For example, the electronic device may perform a screen lock function, an application lock function, and/or a payment function using fingerprint authentication.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

Fingerprint information may be registered in an electronic device by a fingerprint different from a user's actual fingerprint. When an operation for fingerprint registration is performed based on an input inputted by a user's finger contacted with (e.g., attached to) a foreign object, fingerprint information different from actual fingerprint information of the user may be registered in the electronic device. For example, when an operation for fingerprint registration is performed based on an input inputted by a finger wearing a glove, thimble, or band, fingerprint information different from the actual fingerprint information of the user may be registered in the electronic device.

When fingerprint information different from the user's actual fingerprint information is registered in the electronic device, fingerprint authentication may be successful even when a user other than the user of the electronic device performs using a finger contacted with a foreign substance. In this case, security for fingerprint authentication may be weakened.

Aspects of the disclosure are to address at least the above-mentioned problems and/or disadvantages and to provide at least the advantages described below. Accordingly, an aspect of the disclosure is to provide a method for updating fingerprint information, in which fingerprint information is updated by a touch inputted by a finger that is not in contact with a foreign object, based on an intensity of a user's touch input on a display module, and electronic devices for supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a fingerprint sensor, a display module comprising a touch sensor, and at least one processor operatively connected to the fingerprint sensor and the display module. The at least one processor may be configured to obtain a first touch input of a user to the display module through the touch sensor. The at least one processor may be configured to perform authentication for the user based on a fingerprint image and registered fingerprint information, the fingerprint being obtained through the fingerprint sensor when obtaining the first touch input. The at least one processor may be configured to identify whether the fingerprint image satisfies a first condition for updating the registered fingerprint information, based on the authentication for the user being successful. The at least one processor may be configured to identify whether an intensity of the first touch input is greater than or equal to a threshold intensity set for determining whether a touch input to the display module is inputted by the user's finger that is not in contact with a foreign material. The at least one processor may be configured to update the registered fingerprint information using the fingerprint image, based on identifying that the fingerprint image satisfies the first condition and that the intensity of the first touch input is equal to or greater than the threshold intensity.

In accordance with another aspect of the disclosure, a method for updating fingerprint information in an electronic device is provided. The method includes obtaining a first touch input of a user to the display module of the electronic device through the touch sensor of the electronic device. The method may comprise performing authentication for the user, based on the fingerprint image and registered fingerprint information, the fingerprint image being obtained through the fingerprint sensor of the electronic device when the first touch input is obtained. The method may comprise identifying, based the authentication for the user being successful, whether the fingerprint image satisfies a first condition for updating the registered fingerprint information. The method may comprise identifying whether an intensity of the first touch input is equal to or greater than a threshold intensity set to determine whether a touch input to the display module is inputted by the user's finger not in contact with a foreign substance. The method may comprises updating, based on identifying that the fingerprint image satisfies the first condition and the intensity of the first touch input is greater than or equal to the threshold intensity, the registered fingerprint information using the fingerprint image.

In an embodiment, in a non-transitory computer-readable medium storing computer-executable instructions, the computer-executable instructions may, when executed, enable a wearable electronic device including at least one processor to obtain a first touch input of a user to the display module through the touch sensor. The computer-executable instructions may, when executed, enable the wearable electronic device including the at least one processor to perform authentication for the user based on a fingerprint image and registered fingerprint information, the fingerprint being obtained through the fingerprint sensor when obtaining the first touch input. The computer-executable instructions may, when executed, enable the wearable electronic device including the at least one processor to identify whether the fingerprint image satisfies a first condition for updating the registered fingerprint information, based on the authentication for the user being successful. The computer-executable instructions may, when executed, enable the wearable electronic device including the at least one processor to identify whether an intensity of the first touch input is greater than or equal to a threshold intensity set for determining whether a touch input to the display module is inputted by the user's finger that is not in contact with a foreign material. The computer-executable instructions may, when executed, enable the wearable electronic device including the at least one processor to update the registered fingerprint information using the fingerprint image, based on identifying that the fingerprint image satisfies the first condition and that the intensity of the first touch input is equal to or greater than the threshold intensity.

In an embodiment, a method for updating fingerprint information and an electronic device supporting the same may cause the electronic device to not perform an operation for fingerprint registration and an operation for fingerprint authentication based on the input inputted by the user's finger that is in contact with the foreign substance by updating fingerprint information by a touch inputted by a finger that is not in contact with a foreign object based on an intensity of a user's touch input on a display module, and enhance security for fingerprint authentication such that authentication using forgery fingerprint (e.g., spoofing) is failed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
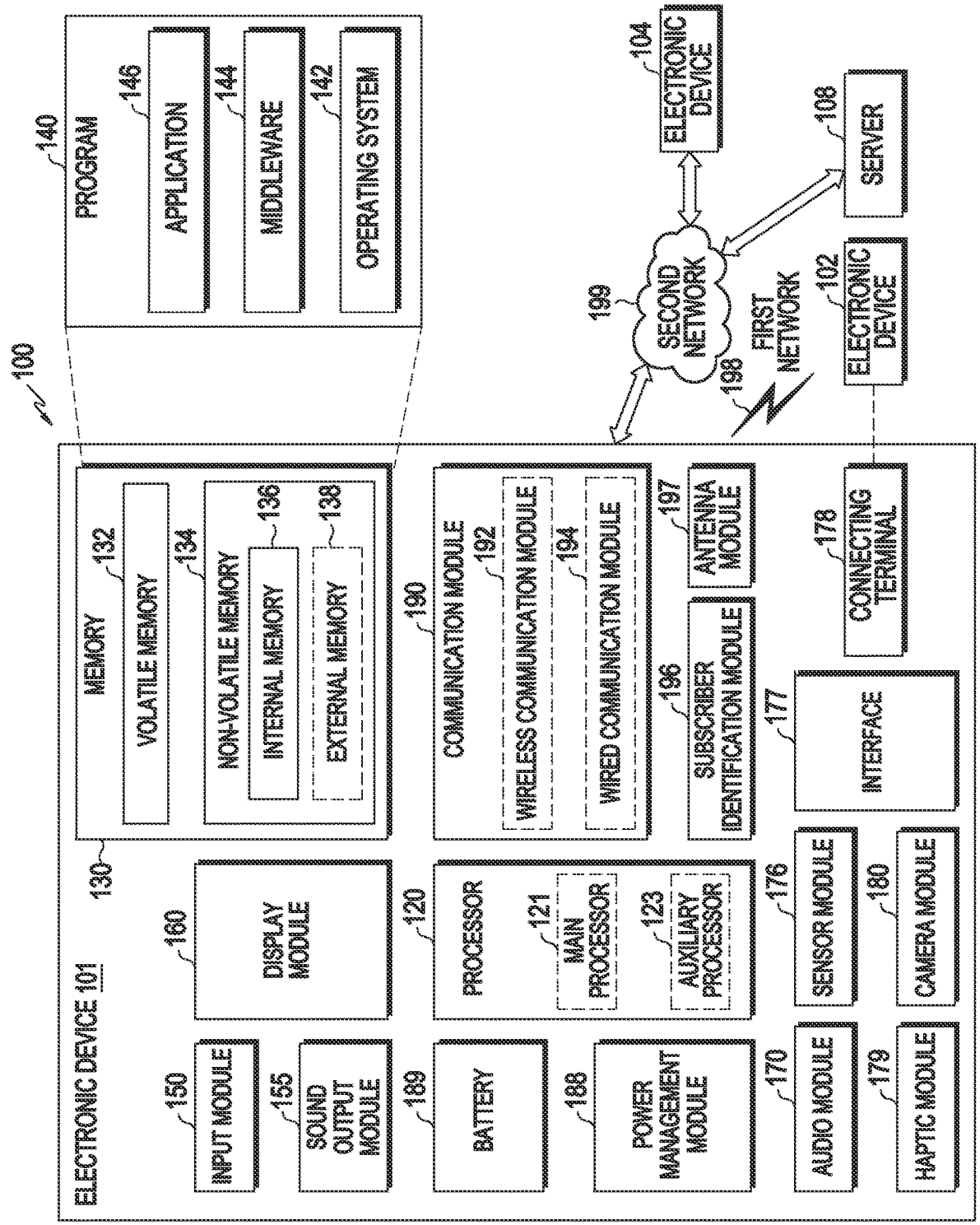
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a fifth-generation (5G) network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 database (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
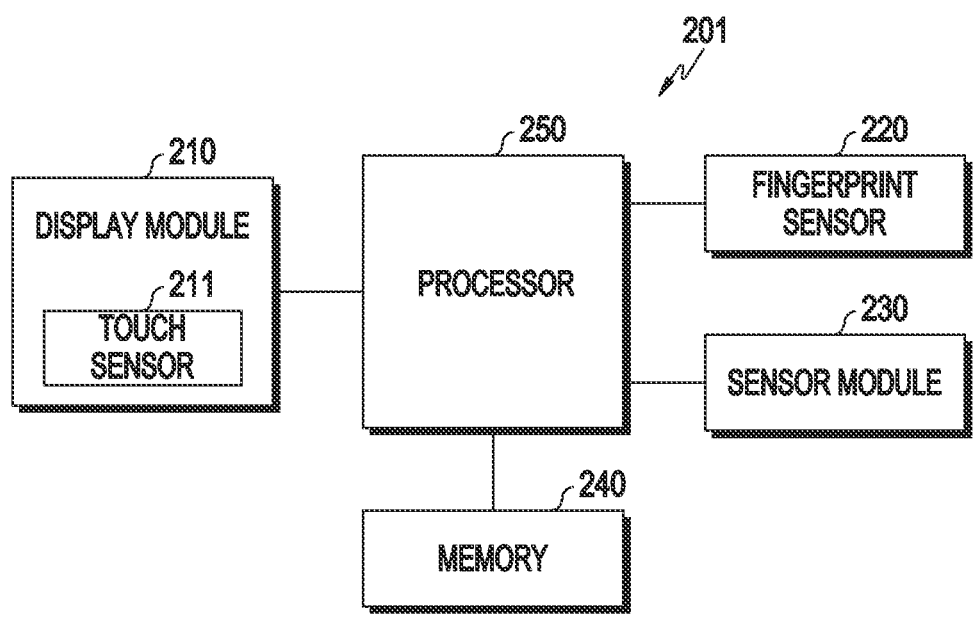
FIG. 2 is a block diagram of an electronic device according to an embodiment of the disclosure.

FIG. 2 is a block diagram of an electronic device 201 according to an embodiment of the disclosure.

In an embodiment, the electronic device 201 may comprise a display module 210, a fingerprint sensor 220, a sensor module 230, a memory 240, and/or a processor 250.

In an embodiment, the display module 210 may be the display module 160 of FIG. 1.

In an embodiment, the display module 210 may display various information.

For example, the display module 210 may display information for guiding fingerprint registration to the user while an operation for fingerprint registration is being performed. For example, the display module 210 may display an image related to a fingerprint (e.g., a fingerprint image indicating a location where a user's fingerprint can be input) at a location of the display module 210 corresponding to a location where the fingerprint sensor 220 is disposed. However, the information displayed by the display module 210 is not limited to the above example.

In an embodiment, the display module 210 may comprise a touch sensor 211.

In an embodiment, the touch sensor 211 may obtain a user's touch input to the display module 210. For example, when a user touches the display module 210 using a finger, the touch sensor 211 may generate a touch signal generated by the touch.

In an embodiment, the touch sensor 211 may be a capacitive touch sensor. For example, the touch sensor 211 may detect an intensity of a touch signal (or an amount of change in the intensity of a touch signal) (e.g., an amount of change in capacitance) using a mutual capacitance method or a self capacitance method. Based on the intensity of the touch signal, a location (e.g., coordinates) touched by the user within the display module 210 may be obtained (e.g., calculated).

In an embodiment, the fingerprint sensor 220 (also referred to as a "fingerprint recognition sensor") may obtain a user's fingerprint image (fingerprint information) based on a touch input to the display module 210.

In an embodiment, the fingerprint sensor 220 may be disposed under (or within the display module 210) the display module 210. The fingerprint sensor 220 may be disposed to overlap at least a portion of the display module 210.

In an embodiment, the fingerprint sensor 220 may obtain a user's fingerprint image by using an optical method based on a difference in light reflected by ridges and valleys constituting the fingerprint, an ultrasonic method based on a difference of the phase of ultrasonic waves reflected by the ridges and valleys, or electrostatic method based on the difference of a dielectric constant caused by ridges and valleys. However, a method of obtaining the fingerprint image by the fingerprint sensor 220 is not limited to the above examples.

In an embodiment, the sensor module 230 may be the sensor module 176 of FIG. 1.

In an embodiment, the sensor module 230 may obtain a state of the electronic device 201 (e.g., information about the state of the electronic device 201). In an embodiment, the state of the electronic device 201 may, when obtaining a touch input to the display module 210 (e.g., when a touch input is inputted to obtain a user's fingerprint image), comprise the state of the electronic device 201 capable of affecting the intensity of the touch input.

In an embodiment, the sensor module 230 may comprise a temperature sensor. For example, when a touch input is inputted to the display module 210 (e.g., when a touch input is inputted to obtain a user's fingerprint image), the intensity of a touch input (e.g., the intensity of a touch signal) may vary by the temperature of the electronic device 201 (e.g., a semiconductor element included in the touch sensor 211). The sensor module 230 may comprise a temperature sensor capable of detecting the temperature of the electronic device 201 when a touch input is inputted to the display module 210 (e.g., when a touch input is inputted to obtain a user's fingerprint image).

In an embodiment, the sensor module 230 may comprise an inertial measurement unit (IMU) sensor (e.g., an acceleration sensor, a gyro sensor). For example, upon a touch input is inputted to the display module 210 (e.g., a touch input is inputted to obtain a user's fingerprint image), the intensity of the touch input may vary by whether or not the electronic device 201 is held by the user. The sensor module 230 may comprise an inertial sensor for detecting, when a touch input is applied to the display module 210 (e.g., when a touch input is performed to obtain a user's fingerprint image), whether or not the electronic device 201 is held by the user's hand, whether or not the electronic device 201 is in a state of being placed on an object (e.g., a table) and/or whether or not the electronic device 201 is in a moving state.

In an embodiment, the sensor module 230 may comprise a grip sensor. For example, upon a touch input is inputted to the display module 210 (e.g., a touch input is inputted to obtain a user's fingerprint image), the intensity of the touch input may vary by whether the electronic device 201 is held by one hand or both hands. The sensor module 230 may comprise a grip sensor for detecting, when a touch input is applied to the display module 210 (e.g., when a touch input is performed to obtain a user's fingerprint image), whether or not the electronic device 201 is held by one hand (e.g., the left hand or the right hand) of the user and/or whether or not the electronic device 201 is in a gripped state by both hands of the user.

However, the sensor included in the sensor module 230 is not limited to the temperature sensor, the IMU sensor, and/or the grip sensor. For example, the sensor module 230 may, when a touch input is inputted to the display module 210 (e.g., a touch input is inputted to obtain a fingerprint image of the user), comprise an additional sensor capable of detecting the state of the electronic device (201), the state of the electronic device 201 being capable of affecting the intensity of the touch input.

In an embodiment, the memory 240 may be the memory 130 of FIG. 1.

In an embodiment, the memory 240 may store registered fingerprint information.

In an embodiment, registered fingerprint information (also referred to as a "fingerprint template") may comprise a registered fingerprint image, minutiae extracted from the fingerprint image (also referred to as a "feature"), and/or a combination of minutiae extracted from a plurality of fingerprint images (e.g., a map composed of minutiae extracted from a plurality of fingerprint images). In an embodiment, the registered fingerprint information may be referred to as a "fingerprint template".

In an embodiment, memory 240 may store a threshold intensity (and a threshold intensity database).

In an embodiment, the threshold intensity may be a value (hereinafter referred to as "threshold intensity") set to determine whether a touch input to the display module 210 is inputted by a user's finger that is not in contact with a foreign substance.

In an embodiment, the threshold intensity DB may be stored in memory 240 after the threshold intensity DB is established by processor 250. A method of establishing the threshold intensity DB is described below.

In an embodiment, the processor 250 may be the processor 120 of FIG. 1.

In an embodiment, the processor 250 may control an overall operation for updating (or registering) fingerprint information. In an embodiment, processor 250 may comprise one or more processors for updating (or registering) fingerprint information. An operation of updating (or registering) fingerprint information by the processor 250 will be described later.

Although the electronic device 201 comprising the display module 210, the fingerprint sensor 220, the sensor module 230, the memory 240, and/or the processor 250 is illustrated in FIG. 2, the electronic device 201 is not limited thereto. For example, the electronic device 201 may further comprise at least one component shown in FIG. 1.

According to an embodiment of the disclosure, an electronic device 201 may comprise a fingerprint sensor 220, a display module 210 including a touch sensor 211, and at least one processor 250 coupled operably with the fingerprint sensor 220 and the display module 210. The at least one processor 250 may be configured to obtain a first touch input of a user to the display module 210 through the touch sensor 211. The at least one processor 250 may be configured to perform authentication for the user based on a fingerprint image and registered fingerprint information, the fingerprint being obtained through the fingerprint sensor 220 when obtaining the first touch input. The at least one processor 250 may be configured to identify whether the fingerprint image satisfies a first condition for updating the registered fingerprint information, based on the authentication for the user being successful. The at least one processor 250 may be configured to identify whether an intensity of the first touch input is greater than or equal to a threshold intensity set for determining whether a touch input to the display module 210 is inputted by the user's finger that is not in contact with a foreign material. The at least one processor 250 may be configured to update the registered fingerprint information using the fingerprint image, based on identifying that the fingerprint image satisfies the first condition and that the intensity of the first touch input is equal to or greater than the threshold intensity.

In an embodiment, if the fingerprint image does not satisfy the first condition or if the intensity of the first touch input is less than the threshold intensity, an operation of updating the registered fingerprint information using the fingerprint image may be omitted.

In an embodiment, the intensity of the first touch input may be a maximum intensity among intensities of touch signals generated by the first touch input.

In an embodiment, the at least one processor 250 may be configured to obtain a second touch input of the user to the display module 210 through the touch sensor 211, identify an intensity of the second touch input, obtain an average and a deviation of the intensity of the second touch input, and set, based on the obtained average and deviation, the threshold intensity.

In an embodiment, the at least one processor 250 may be configured to set, as the threshold intensity, an intensity greater than the intensity of a touch input inputted by the user's finger that is in contact with the foreign material and less than the average.

In an embodiment, the electronic device 201 may further comprise a sensor module 230, and the at least one processor 250 may be configured to detect a state of the electronic device 201 through the sensor module 230 when the second touch input is obtained, map the state of the electronic device 201 and the threshold intensity, and store the mapped state of the electronic device 201 and threshold intensity in a memory 240 of the electronic device 201.

In an embodiment, the state of the electronic device 201 may include the temperature of the electronic device 201, whether the electronic device 201 is held by the user, and/or whether the electronic device 201 is placed on an object.

In an embodiment, the at least one processor 250 may be configured to identify that the fingerprint image satisfies the first condition, if an amount of minutiae of the fingerprint image is greater than an amount of minutiae of the registered fingerprint information, if the fingerprint image has a quality higher than a quality of the registered fingerprint information, and/or if the fingerprint image is obtained more recently than the registered fingerprint information.

In an embodiment, the at least one processor 250 may be configured to obtain a third touch input of the user to the display module 210 through the touch sensor 211, identify, when the third touch input is obtained, whether the fingerprint image obtained through the fingerprint sensor 220 satisfies a second condition for fingerprint registration, identity whether an intensity of the third touch input is greater than or equal to the threshold intensity, and register the fingerprint image, based on identifying that the fingerprint image satisfies the second condition and that the intensity of the third touch input is greater than or equal to the threshold intensity.

In an embodiment, the at least one processor 250 may be configured to identify that the second condition is satisfied, if an amount of minutiae of the fingerprint image is equal to or greater than a specified amount, and/or if a quality of the fingerprint image is equal to or higher than a specified quality.

Figure 3:
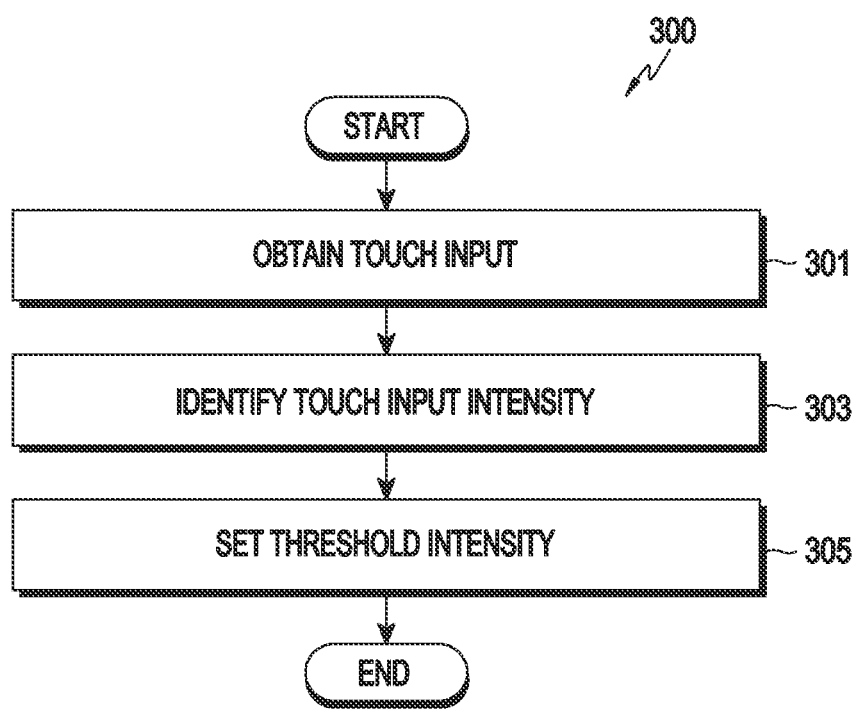
FIG. 3 is a flowchart illustrating a method for setting a threshold intensity according to an embodiment of the disclosure.

FIG. 3 is a flowchart 300 illustrating a method for setting a threshold intensity according to an embodiment of the disclosure.

Referring to FIG. 3, in operation 301, in an embodiment, the processor 250 may obtain a touch input to the display module 210 through the touch sensor 211.

In an embodiment, the processor 250 may obtain the touch input for setting the threshold intensity through the touch sensor 211.

In an embodiment, the threshold intensity may be a value set to determine whether a touch input to the display module 210 is inputted by a user's finger that is not in contact with a foreign material (e.g., a finger in which a fingerprint is not in contact with a foreign material).

In an embodiment, the touch input for setting the threshold intensity may include an input inputted by a touch and obtained through the touch sensor 211 to perform an operation for fingerprint authentication or an operation for fingerprint registration. A method for obtaining a touch input for setting the threshold intensity is described below with respect to FIG. 4.

Figure 4:
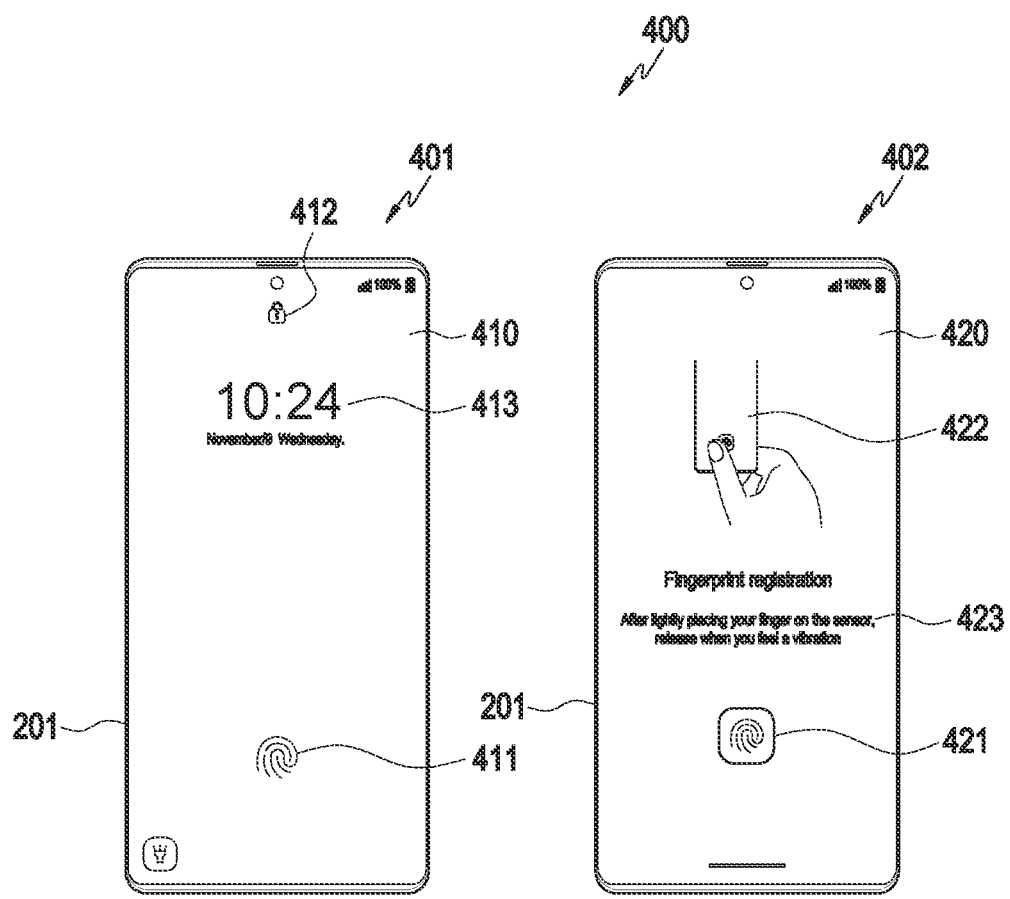
FIG. 4 is a drawing illustrating a method for obtaining a touch input for setting a threshold intensity according to an embodiment of the disclosure.

FIG. 4 is a drawing 400 illustrating a method for obtaining a touch input for setting a threshold intensity according to an embodiment of the disclosure.

Referring to FIG. 4, the touch input for setting the threshold intensity may be a touch input obtained to perform an operation for fingerprint authentication.

Referring to reference numeral 401 of FIG. 4, in an embodiment, the processor 250 may display a lock screen 410 through the display module 210. For example, the processor 250 may, through the display module 210, in a state in which the electronic device 201 is locked, display an image 411 for fingerprint input, an object 412 indicating that the electronic device 201 is in a locked state, and/or time information 413, the image 411 being displayed in a position of the display module 210 corresponding to a position where the fingerprint sensor 220 is disposed.

In an embodiment, the processor 250 may obtain a touch input through the touch sensor 211 when a user touches, using a finger, an area where the image 411 for the fingerprint input is displayed. When obtaining the touch input, the processor 250 may perform an operation for fingerprint authentication in order to unlock the electronic device 201.

However, a touch input obtained to perform the operation for the fingerprint authentication is not limited to the touch input obtained to unlock the electronic device 201. For example, the touch input obtained to perform the operation for the fingerprint authentication may include a touch input obtained to release a lock which is set for an application and/or a touch input obtained to release a lock which is set for a payment function.

In an embodiment, the touch input for setting the threshold intensity may be a touch input obtained to perform an operation for fingerprint registration.

Referring to reference numeral 402 of FIG. 4, in an embodiment, the processor 250 may display a screen 420 for fingerprint registration through the display module 210. For example, the processor 250 may, based on an input for setting (e.g., registering) a fingerprint, through the display module 210, display an image 422 and information 423 for guiding fingerprint registration with the image 421 for fingerprint input, the image 421 being displayed at the position of the display module 210 corresponding to the location where the fingerprint sensor 220 is disposed.

In an embodiment, the processor 250 may, when a user touches an area where the image 421 for fingerprint input is displayed using a finger, obtain a touch input through the touch sensor 211. When obtaining a touch input, the processor 250 may perform an operation for registering a fingerprint.

Referring back to FIG. 3, in operation 303, in an embodiment, the processor 250 may identify an intensity of the touch input.

In an embodiment, the processor 250 may identify the intensity of the touch input (e.g., the intensity of a touch signal generated by a touch on the display module 210). For example, the processor 250 may identify an amount of change in capacitance by the touch input.

In an embodiment, the processor 250 may identify a maximum intensity of the touch input when obtaining the touch input.

In an embodiment, the processor 250 may identify intensities of touch signals generated at respective points of an area touched by a user (e.g., a user's finger) within the display module 210. For example, the touch sensor 211 implemented based on the mutual capacitance method may obtain (e.g., detect) touch signals from respective nodes where one touch input is detected among nodes where Tx electrodes and Rx electrodes intersect. The processor 250 may identify intensities of the obtained touch signals. The processor 250 may identify the largest intensity among the intensities of the touch signals as the maximum intensity of the touch input.

In an embodiment, when the touch input is obtained a plurality of times, the processor 250 may identify the maximum intensity of the touch signal at each of touch inputs obtained a plurality of times. For example, when the user touches the display module 210 three times using a finger (e.g., when the user touches down the display module 210 three times using a finger), the processor 250 may identify the maximum intensity of the touch signal at each of the three touches. For example, when the user touches the display module 210 three times consecutively using a finger, the processor 250 may identify the maximum intensity of the touch signal generated by the first touch input, the maximum intensity of the touch signal generated by the second touch input, and the maximum intensity of the touch signal generated by the third touch input. For example, the processor 250 may, when a touch of the user's finger on the display module 210 is maintained for a certain period of time (e.g., when the user performs a long press on the display module 210 using a user's finger), obtain a touch input at a specified period. The processor 250 may identify the maximum intensity of the touch signal at each of touch input obtained at each specified period. For example, while the touch of the user's finger on the display module 210 is maintained for a certain period of time, the processor 250 may obtain, at a specified period, a first touch input at a first time, a second touch input at a second time following the first time, and a third touch input at a third time following the second time. The processor 250 may identify a maximum intensity of a touch signal generated by the first touch input, a maximum intensity of a touch signal generated by the second touch input, and a maximum intensity of a touch signal generated by the third touch input.

In an embodiment, the processor 250 may store the maximum intensity of the identified touch input in the memory 240.

In an embodiment, the processor 250 may repeatedly perform operations 301 and 303 until an amount (e.g., the number of values that are cumulatively stored in the memory 240 and represent the touch input intensities) of touch input intensity (e.g., the maximum intensity of the touch input) equal to or greater than an amount designated to set the threshold intensity is stored in the memory 240. For example, the processor 250 may, until the amount of intensity of the touch input (e.g., maximum intensity of the touch input) equal to or greater than the amount designated to set the threshold intensity is stored in the memory 240 from a point of time the user first uses the electronic device 201 (or resets the electronic device 201), store, in the memory 24, the intensity of the touch input (e.g., maximum intensity of the touch input) obtained at each time when an operation for fingerprint authentication or an operation for fingerprint registration is performed (e.g., touch input maximum intensity).

In an embodiment, the processor 250 may, until the amount (e.g., the number of values that are cumulatively stored in the memory 240 and represent the touch input intensities) of intensities of the touch input (e.g., maximum intensities of the touch input) is stored in the memory 240 become at least the amount designated to set the threshold intensity, may repeatedly perform operations 301 and 303 for a specified time (or period).

In an embodiment, the touch sensor 211 may comprise a touch panel that generates a touch signal representing a change in capacitance generated in a region touched by a user's finger and a touch controller (or "touch IC (integrated touch IC)) that controls the touch panel. The touch controller may apply a driving signal for driving the touch panel to the touch panel, and may receive a signal representing a change in capacitance from the touch panel. The touch controller may, based on the received signal representing the change in capacitance, calculate the intensity of the touch input (e.g., the maximum intensity of the touch input) and touch coordinates, and may provide the intensity of the touch input and touch coordinates to the application processor 250.

In operation 305, in an embodiment, the processor 250 may set a threshold intensity based on the intensity of the touch input.

In an embodiment, the processor 250 may set the threshold intensity based on maximum intensities of touch signals (e.g., maximum intensities of touch signals). For example, in case that maximum intensities of touch signals are stored in the memory 240, the processor 250 may set the threshold intensity based on the maximum intensities of touch signals.

In an embodiment, the threshold intensity may be greater than the intensity of a touch input inputted by a finger in contact with a foreign object. Hereinafter, with reference to FIGS. 5 and 6, a method of setting the threshold intensity will be described.

Figure 5:
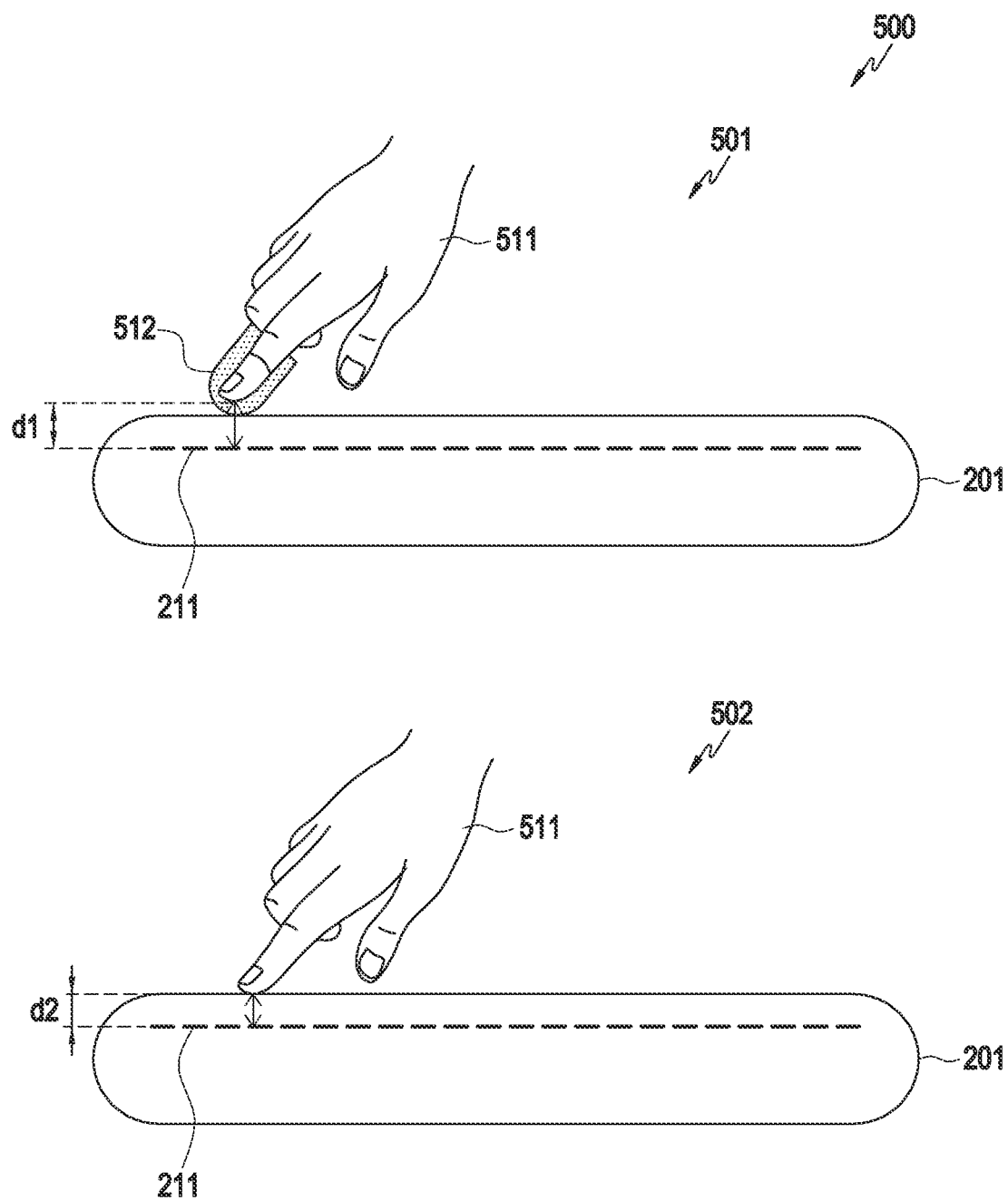
FIG. 5 is a drawing illustrating a method for setting a threshold intensity according to an embodiment of the disclosure.

FIG. 5 is a drawing 500 illustrating a method for setting a threshold intensity according to an embodiment of the disclosure.

Referring to FIG. 5, in an embodiment, reference numeral 501 of FIG. 5 may indicate a case of touching a display module 210 using a finger 511 contacted (e.g., attached to) with a foreign material 512 (e.g., glove, thimble, band, or counterfeit fingerprint). In case that a touch input to the display module 210 is inputted using a finger contacted with a foreign substance, the distance between the finger and the touch sensor 211 may be d1.

In an embodiment, reference numeral 502 of FIG. 5 indicates a case in which a foreign object (e.g., a glove, a thimble, a band, or a fake fingerprint) touches the display module 210 using a finger that is not in contact with the display module 210 (in case of a finger directly touching the display module 210). When a touch input to the display module 210 is inputted using a finger not in contact with a foreign substance, the distance between the finger and the touch sensor 211 may be d2 shorter than d1.

In an embodiment, the intensity of a touch signal (hereinafter, referred to as "first intensity of the touch signal") obtained when a touch input to the display module 210 is inputted using a finger that is not in contact with the foreign substance may be greater than the intensity of a touch signal (hereinafter, referred to as "second intensity of a touch signal") obtained when a touch input to the display module 210 is inputted using a finger that is in contact with the foreign substance.

Equation 1 below is an equation for calculating capacitance.

$$C=\varepsilon*(A/d) \qquad \text{Equation 1}$$

In Equation 1, C represents a capacitance, A represents an area of each of the conductor plates forming an electric field, d may represent a distance between the conductor plates, and c represents a material between the conductor plates (e.g., air, insulator).

In an embodiment, according to Equation 1, the shorter the distance between the finger and the touch sensor 211, the larger the capacitance. For example, since the distance d2 between the finger and the touch sensor 211 in reference numeral 502 is shorter than the distance d1 between the finger and the touch sensor 211 in reference numeral 501, the first intensity of the touch signal may be greater than the second intensity of the touch signal.

In an embodiment, the processor 250 may set the threshold intensity based on the first intensity of the touch signal being greater than the second intensity of the touch signal.

Figure 6:
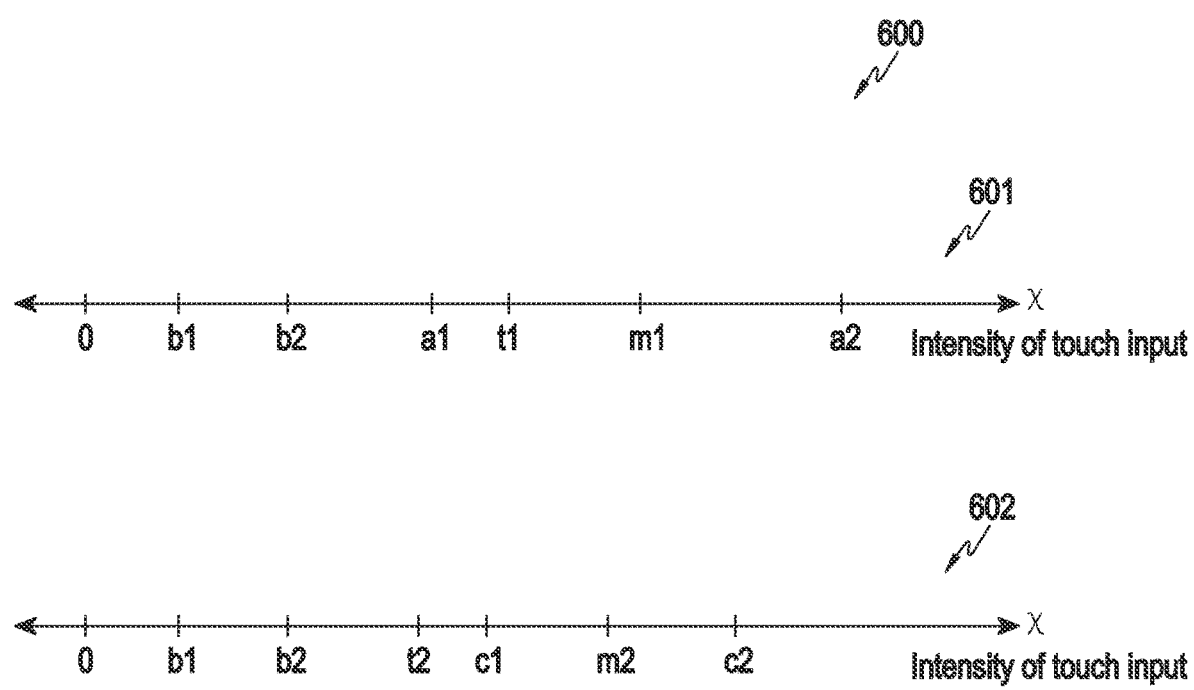
FIG. 6 is a drawing illustrating a method for setting a threshold intensity according to an embodiment of the disclosure.

FIG. 6 is a drawing 600 illustrating a method for setting a threshold intensity according to an embodiment of the disclosure.

Referring to FIG. 6, in an embodiment, the processor 250 may set the threshold intensity based on maximum intensities of touch signals (e.g., maximum intensities of touch signals stored in the memory 240). For example, the processor 250 may obtain (e.g., calculate) average intensities and deviations (e.g., standard deviations) of the maximum intensities of the touch signals. The processor 250 may set the threshold intensity based on the average intensity and the deviation of the maximum intensities of the touch signals.

In an embodiment, in reference numeral 601 of FIG. 6, the x-axis may represent the intensity of the touch input (e.g., an absolute value of the maximum intensity of the touch signal generated by the touch input). m1 may represent an average intensity of maximum intensities of touch signals, a1 may represent a minimum intensity among the maximum intensities of the touch signals, and a2 may represent a maximum intensity among the maximum intensities of the touch signals. In reference numeral 601, the intensity of a touch signal of a touch input inputted by a finger touching a foreign material may be within a range of b1 or more, and less than or equal to b2.

In an embodiment, the processor 250 may set, as the threshold intensity, an intensity smaller than the average m1 of the maximum intensities of the touch signals, and greater than the second intensity of the touch signal of the touch input inputted by the finger touching the foreign object.

In an embodiment, the processor 250, as shown in reference numeral 601 of FIG. 6, may set, as the threshold intensity, an intensity (e.g., t1) less than the average m1 of the maximum intensities of the touch signals and greater than the minimum intensity a1 of the maximum intensities of the touch signals. For example, the processor 250 may set the threshold intensity using Equation 2 below.

$$t=m-k*\sigma \qquad \text{Equation 2}$$

In Equation 2, t represents a threshold intensity, m represents maximum intensities of touch signals, σ represents a standard deviation of maximum intensities of touch signals, and k represents a constant.

In an embodiment, the processor 250, in Equation 2, may set k (e.g., 2, 3) such that the threshold intensity is smaller than the average m of the maximum intensities of the touch signals and greater than the minimum intensity (e.g., a1) of the maximum intensities of the touch signals.

In an embodiment, in Equation 2, the processor 250 may set k to a smaller value as the standard deviation σ increases or as the minimum intensity of the maximum intensities of touch signals (e.g., a1) decreases.

In the above example, it has been described that the threshold intensity is set to an intensity greater than the minimum intensity (e.g., a1) of the maximum intensities of the touch signals, but embodiments of the disclosure are not limited thereto.

In an embodiment, in reference numeral 602 of FIG. 6, the x-axis may represent the intensity of a touch input. m2 may represent an average intensity of maximum intensities of touch signals, c1 may represent a minimum intensity among maximum intensities of touch signals, and c2 may represent a maximum intensity among maximum intensities of touch signals. In reference numeral 602, the intensity of a touch signal of a touch input inputted by a finger that is in contact with a foreign material may be within a range of b1 or more and less than or equal to b2. As shown by reference numeral 602, the processor 250 may set, as the threshold intensity, an intensity (e.g., t2) that is smaller than the average m2 of the maximum intensities of the touch signals and smaller than the minimum intensity c1 of the maximum intensities of the touch signals (and greater than intensities in the range from b1 to b2).

In an embodiment, the processor 250 may, based on the average of the maximum intensities of the touch signals and the standard deviation of the maximum intensities of the touch signals (and/or the minimum intensity of the maximum intensities of the touch signals), set, as the threshold intensity, an intensity greater than or less than the minimum intensity of the maximum intensities of the touch signals. For example, in case that the standard deviation of the maximum intensities of the touch signals is less than or equal to a specified standard deviation, the processor 250 may set, as the threshold intensity, an intensity less than the minimum intensity of the maximum intensities of the touch signals. For example, in case that the standard deviation of the maximum intensities of the touch signals exceeds a specified standard deviation, the processor 250 may set, as the threshold intensity, an intensity greater than the minimum intensity of the maximum intensities of the touch signals.

Figure 7:
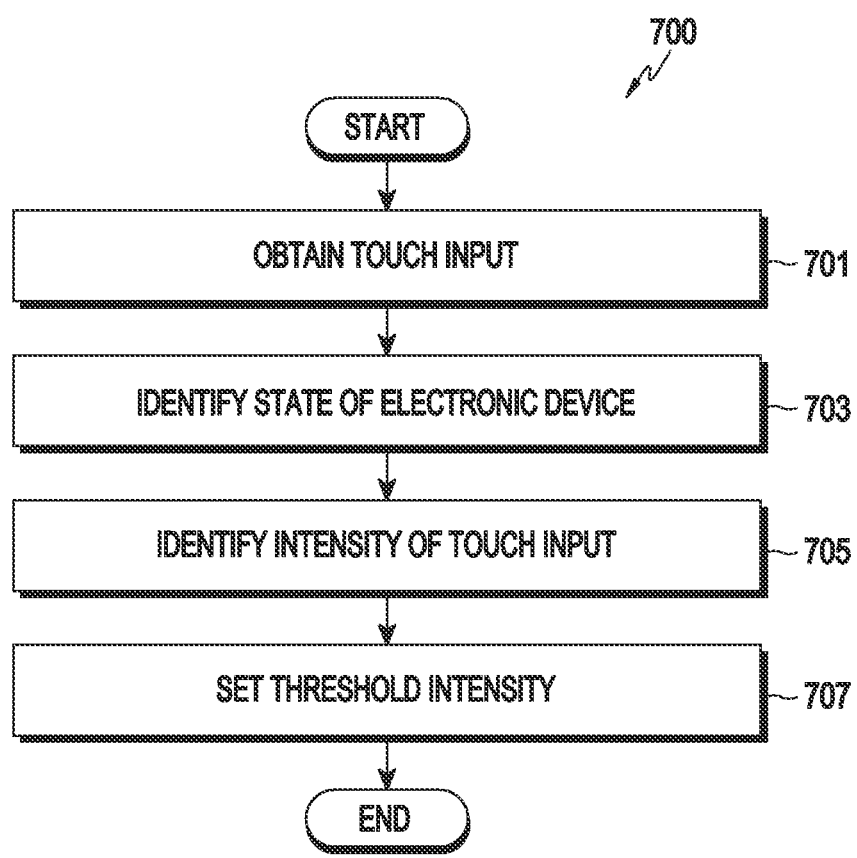
FIG. 7 is a flowchart illustrating a method for setting a threshold intensity for each state of an electronic device according to an embodiment of the disclosure.

FIG. 7 is a flowchart 700 illustrating a method for setting threshold intensity for each state of an electronic device according to an embodiment of the disclosure.

Referring to FIG. 7, in operation 701, in an embodiment, the processor 250 may obtain a touch input to the display module 210 through the touch sensor 211.

Since operation 701 is at least partially the same as or similar to operation 301 of FIG. 3, a detailed description thereof will be omitted.

In operation 703, in an embodiment, the processor 250 may identify a state of the electronic device 201 when obtaining a touch input.

In an embodiment, the state of the electronic device 201 may include the state of the electronic device 201 capable of affecting an intensity of the touch input at a time when a touch input is inputted to the display module 210 (e.g., when a touch input is inputted to obtain a user's fingerprint image). For example, the state of the electronic device 201 may comprise the temperature of the electronic device 201, whether it is held by a user, and/or whether the electronic device is placed on an object (e.g., table), at the time when the touch input is obtained. Whether the electronic device 201 is held by the user may include whether the electronic device 201 is held by one hand (e.g., left or right hand) of the user, and/or whether the electronic device 201 is held by both hands of the user. For example, when a touch input is inputted to the display module 210 (e.g., when a touch input is inputted to obtain a user's fingerprint image), the intensity of the touch input (e.g., the intensity of the touch signal) may vary depending on the temperature of the electronic device 201 (e.g., a semiconductor element included in the touch sensor 211). For example, upon a touch input is inputted to the display module 210 (e.g., a touch input is inputted to obtain a user's fingerprint image), the intensity of the touch input may vary depending on whether or not the electronic device 201 is held by the user. Upon a touch input is inputted to the display module 210 (e.g., a touch input is inputted to obtain a user's fingerprint image), the intensity of the touch input may vary depending on whether the electronic device 201 is held by one hand or both hands of the user.

In an embodiment, the processor 250 may detect (e.g. measure) the temperature of the electronic device 201 through a temperature sensor when a touch input is inputted to the display module 210 (e.g., when a touch input is inputted to obtain a user's fingerprint image).

In an embodiment, the processor 250, through the IMU sensor, when a touch input is inputted to the display module 210 (e.g., when a touch input is inputted to obtain a user's fingerprint image), may detect whether or not the electronic device 201 is in a state of being gripped by the user's hand, whether the electronic device 201 is in a state in which the electronic device 201 is placed on an object (e.g., table), and/or whether the electronic device 201 is in a state in which the electronic device 201 is moving.

In an embodiment, the processor 250, through the grip sensor, when a touch input is inputted to the display module 210 (e.g., when a touch input is inputted to obtain the user's fingerprint image), may detect whether the electronic device 201 is in a state in which the electronic device 201 is being held by a hand (e.g., the left hand or the right hand) and/or whether the electronic device 201 is in a state in which the electronic device 201 is being held by both hands of the user.

In operation 705, In an embodiment, the processor 250 may identify the intensity of the touch input.

Operation 705 is at least partially the same as or similar to operation 303 of FIG. 3 and thus a detailed description thereof will be omitted.

In operation 707, according to an embodiment, the processor 250 may set a threshold intensity for each state of the electronic device 201 based on the intensity of the touch input.

In operation 707, a duplicate description of operation 305 will be omitted.

In an embodiment, the processor 250 may obtain the intensity of the touch input (e.g., the maximum intensity of a touch signal of the touch input) for each state of the electronic device 201. For example, the intensity of touch input for each state of the electronic device 201 may be as shown in Table 1 below.

TABLE 1

| | whether gripped | whether one-hand gripped | temperature | maximum intensity of touch signal |
|---|---|---|---|---|
| touch input 1 | hand grip | both hands grip | 25 degrees | value 1 |
| touch input 2 | laid on a table | one-handed grip | 20 degrees | value 2 |
| touch input 3 | hand grip | one-handed grip | 30 degrees | value 3 |
| ... | ... | ... | ... | ... |

In an embodiment, in Table 1, "whether gripped" indicates whether the electronic device 201 is held by the user's hand (or placed on a table). In Table 1, "whether one-handed gripped" indicates whether the electronic device 201 is held by one hand or both hands of the user. In Table 1, "the maximum intensity of touch signal" indicates the greatest intensity among intensities of touch signals at each point of a region touched by a finger in the display module 210 in each touch input. In Table 1, touch input 1, touch input 2, and touch input 3 are exemplified as touch inputs, but are not limited thereto. For example, the processor 250 may, from a time when the user first uses the electronic device 201 (or when the electronic device 201 is reset) until an amount of touch input intensity (e.g., the maximum touch input intensity) equal to or greater than an amount designated for setting the threshold intensity is stored in the memory 240, obtain the intensity of touch input (e.g., maximum touch input) for each state of the electronic device 201 whenever an operation for fingerprint authentication or fingerprint registration is performed. In an embodiment, the processor 250 may set a threshold intensity for each state of the electronic device 201. For example, the processor 250 may obtain (e.g., calculate) the average and the deviation of the intensity of the touch input for each state of the electronic device 201 based on the obtained intensity of the touch input for each state of the electronic device 201. The processor 250 may set the threshold intensity for each state of the electronic field based on the average and deviation of the intensity of the touch input.

In an embodiment, the processor 250 may set the threshold intensity for each state of the electronic device 201, as shown in Table 2.

TABLE 2

| State of electronic device 201 | Threshold intensity |
|---|---|
| State 1 | t1 |
| State 2 | t2 |
| State 3 | t3 |
| ... | ... |

For example, in Table 2, State 1 may be a state in that the electronic device 201 is gripped by both hands of the user and the temperature (or temperature range) of the electronic device 201 is 25 degrees (or a first temperature range). State 2 may be a state in which the electronic device 201 is gripped by one hand of the user and the temperature (or temperature range) of the electronic device 201 is 15 degrees (or a second temperature range). State 3 may be a state in which the electronic device 201 which is not gripped by the user's hand is placed on the table and the temperature (or temperature range) of the electronic device 201 is 30 degrees (or a third temperature range). State 1, State 2, and State 3 described above are examples, are not limited thereto. In Table 2, state 1, state 2, and state 3 are exemplified, but are not limited thereto. In an embodiment, the processor 250 may map (correspond to) the state of the electronic device 201 and threshold intensity and store the mapped state and threshold intensity in the memory 240. Hereinafter, as shown in Table 2, the mapped state and threshold intensity of the electronic device 201 will be referred to as a "threshold intensity database (DB)".

Figure 8:
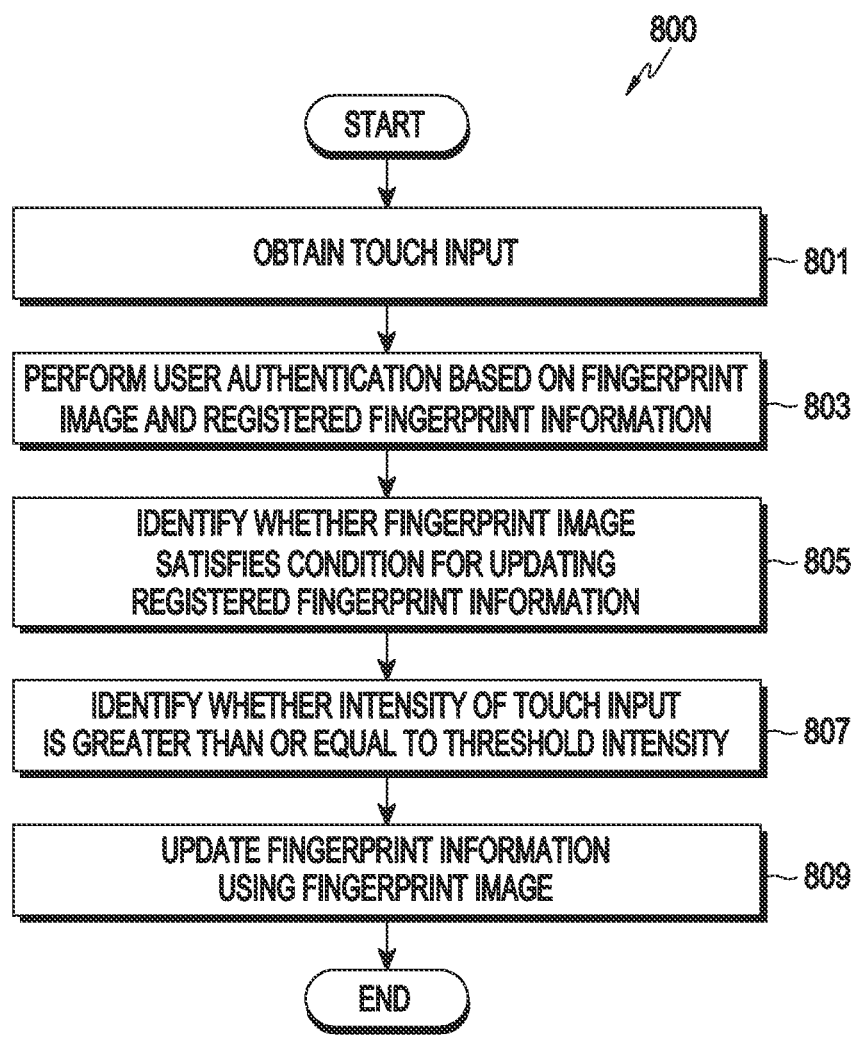
FIG. 8 is a flowchart illustrating a method for updating fingerprint information according to an embodiment of the disclosure.

FIG. 8 is a flowchart 800 illustrating a method for updating fingerprint information according to an embodiment of the disclosure.

In an embodiment, FIG. 8 may be a diagram for explaining operations performed after the threshold intensity is set through FIG. 3.

Referring to FIG. 8, in operation 801, the processor 250 may obtain a user's touch input to the display module 210 through the touch sensor 211.

In an embodiment, the processor 250 may, in order to perform an operation for fingerprint authentication, obtain a user's touch input to the display module 210 through the touch sensor 211. For example, the processor 250 may, through the touch sensor 211, obtain a touch input for unlocking the electronic device 201, a touch input for unlocking a lock which is set for an application, and/or a touch input for unlocking a lock which is set for a payment function. For example, the processor 250 may obtain a touch input using a user's finger on a location of the display module 210 corresponding to a location where the fingerprint sensor 220 is disposed. For example, the processor 250 may obtain an input inputted by touching, by a user's finger, an image for fingerprint input displayed at a location of the display module 210 corresponding to a location where the fingerprint sensor 220 is disposed.

In operation 803, in an embodiment, the processor 250 may perform user authentication based on the fingerprint image and registered fingerprint information, the fingerprint image being obtained through the fingerprint sensor 220 when the touch input is obtained.

In an embodiment, the processor 250 may obtain the fingerprint image through the fingerprint sensor 220 when obtaining the touch input. The processor 250 may perform an operation for authenticating a user based on the obtained fingerprint image and the registered fingerprint information.

In an embodiment, the processor 250 may perform a preprocessing operation including an operation of extracting a direction component of the fingerprint image, a binarization operation, an equalization operation, and/or a thinning operation. After performing a preprocessing operation on the fingerprint image, the processor 250 may extract minutiae from the fingerprint image. Minutiae may include a core point, a delta point, an ending point, and/or a bifurcation point constituting a ridge of a fingerprint.

In an embodiment, the processor 250 may determine whether authentication of the user succeeds or fails by comparing the fingerprint image and the registered fingerprint information. For example, the processor 250 may compare minutiae of the fingerprint image and minutiae of the registered fingerprint information. The processor 250, through comparing the minutiae of the fingerprint image and the registered fingerprint information, may calculate the degree of similarity (e.g., a similarity score) (hereinafter referred to as "similarity of fingerprint image") between the fingerprint image and the registered fingerprint information. The processor 250 may, if the similarity of the fingerprint image is greater than or equal to the specified similarity, determine that authentication of the user is successful. The processor 250 may determine that authentication of the user fails if the similarity of the fingerprint image is less than the specified similarity.

In an embodiment, the processor 250, when it is determined that authentication for the user fails, may omit the following operations or display through the display module 210 information requesting the user to retry an operation for authentication (e.g., a touch input to the fingerprint sensor 220).

In operation 805, in an embodiment, the processor 250 may identify whether the fingerprint image satisfies a condition for updating registered fingerprint information based on the success of user authentication.

In an embodiment, the processor 250, based on a determination that the authentication of the user succeeds, may determine whether a fingerprint image (hereinafter referred to as "obtained fingerprint image") obtained through the fingerprint sensor 220 when the touch input is obtained in operation 801 satisfies a condition for updating registered fingerprint information (hereinafter referred to as "first condition").

In an embodiment, the processor 250 may, identify that the first condition is satisfied in case that an amount of minutiae of the fingerprint image is greater than an amount of minutiae of the registered fingerprint information or the fingerprint image includes minutiae not included in the registered fingerprint information. For example, the processor 250 may identify that the first condition is satisfied in case that an amount of minutiae of the fingerprint image is greater than an amount of minutiae of a registered fingerprint image or the fingerprint image includes minutiae not included in the registered fingerprint image.

In an embodiment, the processor 250 may identify that the first condition is satisfied in case that the fingerprint image has a quality higher than a quality of the registered fingerprint information. For example, the processor 250 may identify that that the first condition is satisfied in case that the obtained fingerprint image is an image from which more accurate minutiae can be extracted compared to a registered fingerprint image (e.g., in case that a value representing a contrast of the obtained fingerprint image is higher than a value representing a contrast of the registered fingerprint image).

In an embodiment, the processor 250 may identify that the obtained fingerprint image satisfies the first condition in case that a similarity of the obtained fingerprint image is higher than a similarity of the registered fingerprint image. For example, the processor 250 may identify that the obtained fingerprint image satisfies the first condition in case that a similarity score of the obtained fingerprint image is higher than a similarity score of the registered fingerprint image obtained when the registered fingerprint image was registered.

In an embodiment, the processor 250 may identify that the obtained fingerprint image satisfies the first condition in case that the fingerprint image is obtained more recently than the registered fingerprint information.

In operation 807, in an embodiment, the processor 250 may identify whether the intensity of the touch input is greater than or equal to the threshold intensity.

In an embodiment, the processor 250 may identify the intensity of the touch input obtained in operation 801. For example, the processor 250 may identify the maximum intensity of a touch signal generated by a touch input (e.g., maximum intensity among intensities of touch signals generated at each point of the touched area).

In an embodiment, the processor 250 may identify whether the maximum intensity of a touch signal generated by a touch input is greater than or equal to a threshold intensity (e.g., a threshold intensity set through FIG. 3).

In FIG. 8, operations 803 and 805 are illustrated as being performed prior to operation 807, but are not limited thereto. For example, operations 803 and 805, and operation 807 may be performed in parallel (or simultaneously). For example, operation 807 may be performed prior to operations 803 and 805.

In operation 809, in an embodiment, the processor 250 may update registered fingerprint information using the fingerprint image, based on identifying that the obtained fingerprint image satisfies the first condition and the intensity of the touch input is greater than or equal to the threshold intensity.

In an embodiment, the processor 250 may update registered fingerprint information using the obtained fingerprint image or minutiae extracted from the obtained fingerprint image. For example, the processor 250 may update registered fingerprint information by adding the obtained fingerprint image or the minutiae extracted from the obtained fingerprint image to the registered fingerprint information, or by substituting a part of the registered fingerprint information with the obtained fingerprint image or minutiae extracted from the obtained fingerprint image.

In an embodiment, the processor 250 may omit an operation of updating the registered fingerprint information using the fingerprint image if the obtained fingerprint image does not satisfy the first condition or if the intensity of the touch input is less than the threshold intensity.

Although not shown in FIG. 8, in an embodiment, if the user authentication is successful in operation 803, the processor 250 may perform an operation set to be performed when the user authentication is successful (e.g., an operation to unlock a lock screen), regardless of whether the fingerprint image satisfies the first condition in operation 805 and whether the intensity of the touch input is equal to or greater than the critical intensity in operation 807. However, it is not limited thereto, and the processor 250 may perform an operation set to be performed when the user authentication is successful only if the authentication of the user succeeds in operation 803, the fingerprint image satisfies the first condition in operation 805, and the intensity of the touch input is greater than or equal to the threshold intensity in operation 807.

Figure 9:
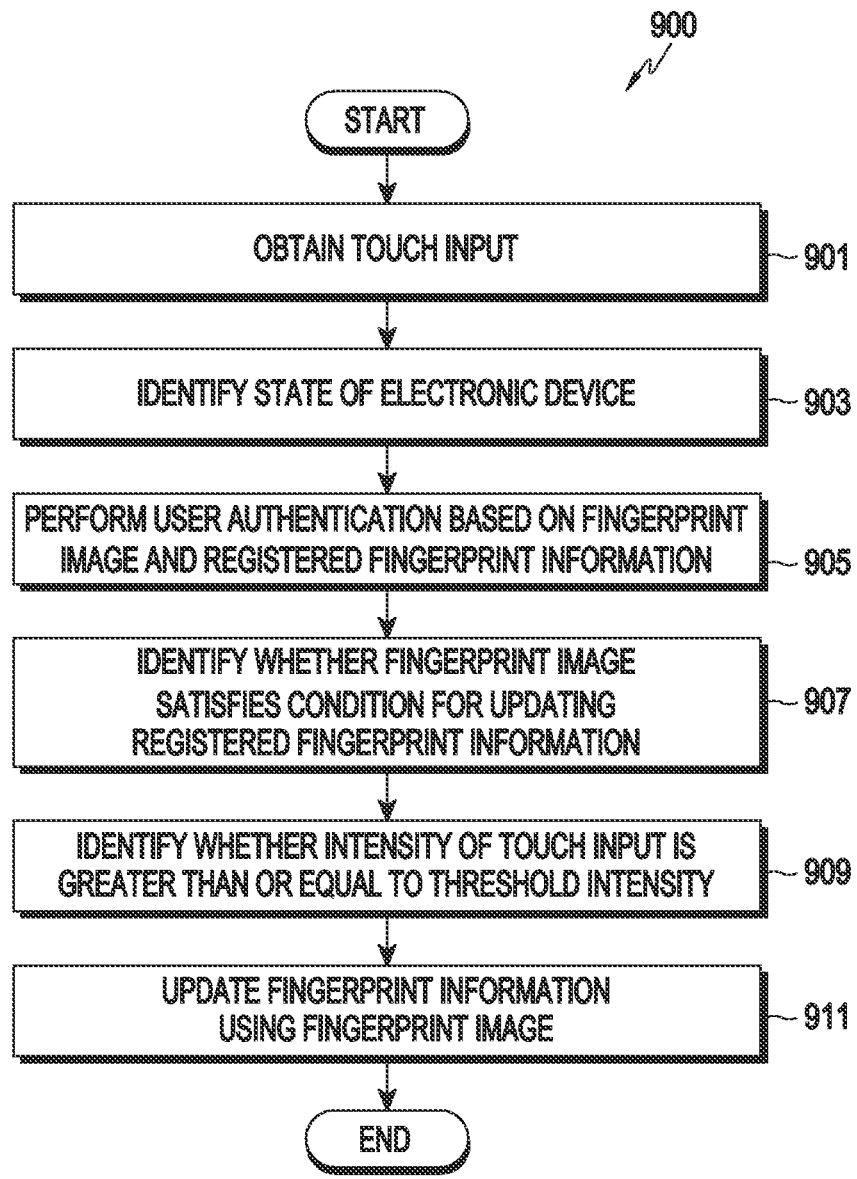
FIG. 9 is a flowchart illustrating a method for updating fingerprint information according to an embodiment of the disclosure.

FIG. 9 is a flowchart illustrating a method for updating fingerprint information according to an embodiment of the disclosure.

In an embodiment, FIG. 9 may be a diagram for explaining operations performed after the threshold intensity DB is established through FIG. 7.

Referring to FIG. 9, in operation 901, the processor 250 may obtain a user's touch input to the display module 210 through the touch sensor 211.

Since operation 901 is at least partially the same as or similar to operation 801 of FIG. 8, a detailed description thereof will be omitted.

In operation 903, in an embodiment, the processor 250 may identify the state of the electronic device 201 when obtaining a touch input.

In an embodiment, the state of the electronic device 201 may include a state of the electronic device 201 capable of affecting an intensity of the touch input at a time when a touch input is inputted to the display module 210 (e.g., when a touch input is inputted to obtain a user's fingerprint image). For example, the state of the electronic device 201 may include the temperature of the electronic device 201 at the time when the touch input is obtained, whether the electronic device 201 is held by a user, and/or whether the electronic device 201 is placed on an object (e.g., table). Whether the electronic device 201 is held by the user may include whether the electronic device 201 is held by one hand (e.g., left or right hand) of the user, and/or whether the electronic device 201 is held by both hands of the user.

In an embodiment, the processor 250 may, when a touch input is inputted to the display module 210 (e.g., when a touch input is inputted to obtain a user's fingerprint image), detect (e.g., measure) the temperature of the electronic device 201 through a temperature sensor.

In an embodiment, the processor 250, through the IMU sensor, when a touch input is inputted to the display module 210 (e.g., when a touch input is inputted to obtain a user's fingerprint image), may detect whether the electronic device 201 is in a state in which the electronic device 201 is being gripped by the user's hand, whether the electronic device 201 is in a state in which is being placed on an object (e.g., table), and/or whether the electronic device 201 is in a state in which the electronic device 201 is moving.

In an embodiment, the processor 250, through the grip sensor, when a touch input is inputted to the display module 210 (e.g., when a touch input is inputted to obtain the user's fingerprint image), may detect whether the electronic device 201 is in a state in which the electronic device 201 is being held by a hand (e.g., the left hand or the right hand) and/or whether the electronic device 201 is in a state in which the electronic device 201 is being held by both hands of the user.

In FIG. 9, operation 903 is illustrated as being performed prior to operation 905 and operation 907, but is not limited thereto. For example, operation 903 may be performed in parallel with operations 905 and 907, or may be performed after operations 905 and 907 are performed.

In operation 905, in an embodiment, the processor 250 may perform authentication for the user, based on the fingerprint image and the registered fingerprint information, the fingerprint image being obtained through the fingerprint sensor 220 upon obtaining a touch input.

Since operation 905 is at least partially the same as or similar to operation 803 of FIG. 8, a detailed description thereof will be omitted.

In operation 907, the processor 250 may identify whether the fingerprint image satisfies a condition for updating registered fingerprint information, based on the authentication for the user being successful.

Since operation 907 is at least partially the same as or similar to operation 805 of FIG. 8, a detailed description thereof will be omitted.

In operation 909, according to an embodiment, the processor 250 may identify whether the intensity of the touch input is greater than or equal to a threshold intensity.

In an embodiment, the processor 250 may identify the intensity of the touch input obtained in operation 901. For example, the processor 250 may identify the maximum intensity of a touch signal generated by a touch input (e.g., maximum intensity among intensities of touch signals generated at each point of the touched area).

In an embodiment, the processor 250 may identify the threshold intensity mapped to the state of the electronic device 201. For example, the processor 250 may, among the mapped states of the electronic device 201 and threshold intensities included in the threshold intensity DB obtained through FIG. 7, identify the threshold intensity mapped to (corresponding to) the state of the electronic device 201 identified through operation 903. For example, the processor 250 may, among the mapped states of the mapped electronic device 201 and threshold intensities included in the threshold intensity DB obtained through FIG. 7, identify, as the threshold intensity to be compared with the intensity of the touch input, the threshold intensity mapped to (corresponding to) the state of the electronic device 201 identified through operation 903. The processor 250 may identify whether the maximum intensity of the touch signal generated by the touch input is greater than or equal to the identified threshold intensity.

In operation 911, in an embodiment, the processor 250 may, based on identifying that the obtained fingerprint image satisfies the first condition and the intensity of the touch input is greater than or equal to the threshold intensity, update registered fingerprint information using the fingerprint image.

Operation 911 is at least partially the same as or similar to operation 809 of FIG. 8, and thus a detailed description thereof will be omitted.

Figure 10:
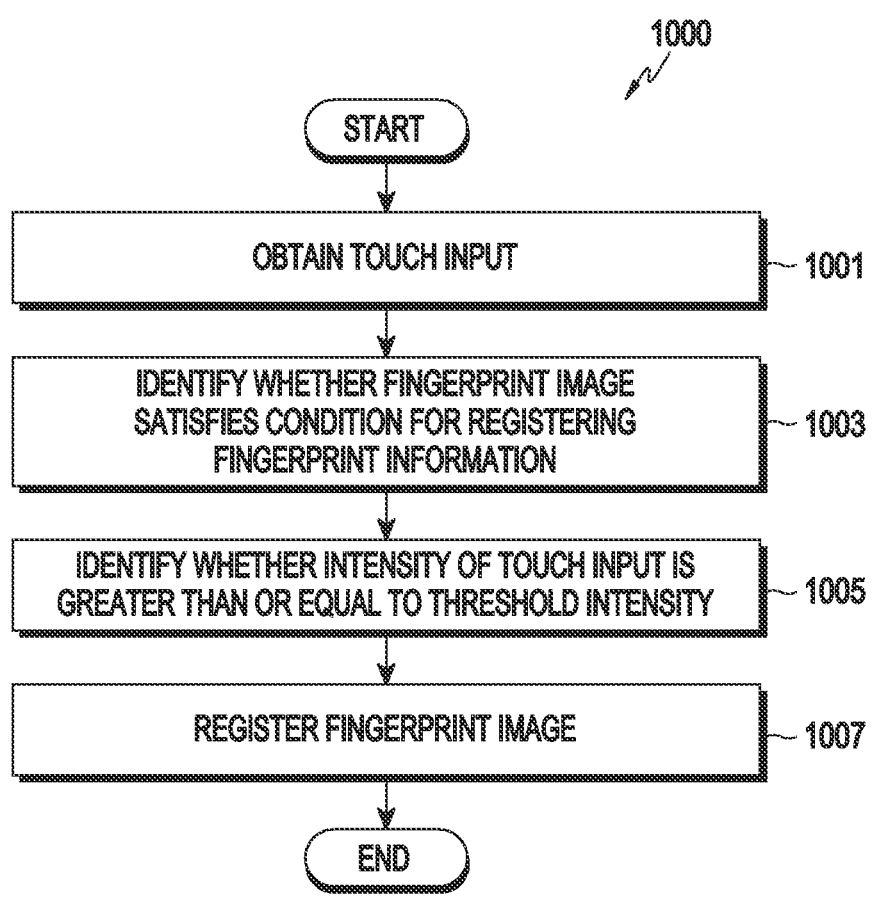
FIG. 10 is a flowchart illustrating a method for registering fingerprint information according to an embodiment of the disclosure.

FIG. 10 is a flowchart 1000 illustrating a method for registering fingerprint information according to an embodiment of the disclosure.

In an embodiment, FIG. 10 may be a diagram for explaining operations performed after the threshold intensity is set through FIG. 3 or after the threshold intensity DB is constructed through FIG. 7.

Referring to FIG. 10, in operation 1001, in an embodiment, the processor 250 may obtain a user's touch input to the display module 210 through the touch sensor 211.

In an embodiment, the processor 250 may obtain a user's touch input to the display module 210 through the touch sensor 211 in order to perform an operation for fingerprint registration. For example, the processor 250 may, through the display module 210, display a screen for fingerprint registration. The processor 250, based on an input for setting (e.g., registering) a fingerprint, may display a screen including an image for fingerprint input, the image being displayed at a position of the display module 210 corresponding to a position where the fingerprint sensor 220 is disposed. In an embodiment, the processor 250 may obtain a touch input through the touch sensor 211 if a user touches an area where an image for fingerprint input is displayed using a finger.

In operation 1003, in an embodiment, the processor 250 may identify whether a fingerprint image obtained through the fingerprint sensor 220 satisfies a condition for fingerprint registration when obtaining a touch input.

In an embodiment, the processor 250 may obtain a fingerprint image through the fingerprint sensor 220 when obtaining a touch input.

In an embodiment, the processor 250 may identify whether the obtained fingerprint image satisfies a condition for fingerprint registration (hereinafter, referred to as a "second condition").

In an embodiment, the processor 250 may, if the obtained fingerprint image includes a specified amount or more of minutiae, identify that the second condition is satisfied in case that an amount of minutiae of the obtained fingerprint image is equal to or greater than a specified amount. For example, the processor 250 may perform a preprocessing operation including an operation extracting a direction component of the fingerprint image, a binarization operation, an equalization operation, and/or a thinning operation on the fingerprint image. The processor 250 may extract minutiae from the fingerprint image after performing the preprocessing operation on the fingerprint image. The processor 250 may identify whether the amount of the extracted minutiae is greater than or equal to the specified amount. The processor 250 may identify that the obtained fingerprint image satisfies the second condition in case that the amount of the extracted minutiae is greater than or equal to the specified amount.

In an embodiment, the processor 250 may identify that the second condition is satisfied in case that the obtained fingerprint image has a quality equal to or higher than a specified quality. For example, the processor 250 may identify that the second condition is satisfied in case that the obtained fingerprint image has a property value (e.g., sharpness) related to the extracted minutiae and equal to or greater than a specified value.

However, conditions for fingerprint registration are not limited to the above examples.

In operation 1005, in an embodiment, the processor 250 may identify whether the intensity of the touch input is greater than or equal to the threshold intensity.

Since operation 1005 is at least partially the same as or similar to operation 807 of FIG. 8, a detailed description thereof will be omitted.

In operation 1007, the processor 250 may register a fingerprint image, based on identifying that the obtained fingerprint image satisfies the second condition and the touch input intensity is greater than or equal to a threshold intensity.

In an embodiment, the processor 250 may register the fingerprint image as at least part of the fingerprint information based on identifying that the obtained fingerprint image satisfies the second condition and the touch input intensity is greater than or equal to a threshold intensity. For example, the processor 250 may add the obtained fingerprint image as a newly registered fingerprint image. For example, the processor 250 may add minutiae extracted from a fingerprint image to registered fingerprint information.

In an embodiment, the processor 250 may not perform an operation of registering a fingerprint image if the obtained fingerprint image does not satisfy the second condition or if the intensity of the touch input is less than the threshold intensity.

Although not shown in FIG. 10, in an embodiment, the processor 250 may perform an operation for fingerprint registration based on the threshold intensity DB. For example, the processor 250 may obtain a touch input. The processor 250 may obtain the state of the electronic device 201 through the sensor module 230. The processor 250 may identify whether the fingerprint image obtained through the fingerprint sensor 220 satisfies the conditions for fingerprint registration. The processor 250 may identify the threshold intensity mapped to the state of the electronic device 201 based on the threshold intensity DB. The processor 250 may identify whether the maximum intensity of the touch signal generated by the touch input is greater than or equal to the identified threshold intensity. The processor 250 may, based on identifying that the obtained fingerprint image satisfies the second condition and that the touch input intensity is greater than or equal to the critical intensity, register the fingerprint image as at least part of the registered fingerprint information.

According to an embodiment of the disclosure, a method for updating fingerprint information in an electronic device 201 may comprise obtaining a first touch input of a user to the display module 210 of the electronic device 201 through the touch sensor 211 of the electronic device 201. The method may comprise performing authentication for the user, based on the fingerprint image and registered fingerprint information, the fingerprint image being obtained through the fingerprint sensor 220 of the electronic device 201 when the first touch input is obtained. The method may comprise identifying, based the authentication for the user being successful, whether the fingerprint image satisfies a first condition for updating the registered fingerprint information. The method may comprise identifying whether an intensity of the first touch input is equal to or greater than a threshold intensity set to determine whether a touch input to the display module 210 is inputted by the user's finger not in contact with a foreign substance. The method may comprises updating, based on identifying that the fingerprint image satisfies the first condition and the intensity of the first touch input is greater than or equal to the threshold intensity, the registered fingerprint information using the fingerprint image.

In an embodiment, if the fingerprint image does not satisfy the first condition or if the intensity of the first touch input is less than the threshold intensity, updating the registered fingerprint information using the fingerprint image may be not performed.

In an embodiment, the intensity of the first touch input may be a maximum intensity among intensities of touch signals generated by the first touch input.

In an embodiment, the method may further comprise obtaining a second touch input of the user to the display module 210 through the touch sensor 211, identifying an intensity of the second touch input, obtaining an average and a deviation of the intensity of the second touch input, and setting, based on the obtained average and deviation, the threshold intensity.

In an embodiment, setting the threshold intensity may comprise setting, as the threshold intensity, an intensity greater than the intensity of a touch input inputted by the user's finger that is in contact with the foreign material and less than the average.

In an embodiment, the method may further comprise detecting a state of the electronic device 201 through a sensor module 230 of the electronic device 201 when the second touch input is obtained, mapping the state of the electronic device 201 and the threshold intensity, and storing the mapped state of the electronic device 201 and threshold intensity in a memory 240 of the electronic device 201.

In an embodiment, the state of the electronic device 201 may include the temperature of the electronic device 201, whether the electronic device 201 is held by the user, and/or whether the electronic device 201 is placed on an object.

In an embodiment, identifying whether the fingerprint image satisfies a first condition may comprise identifying that the fingerprint image satisfies the first condition, if an amount of minutiae of the fingerprint image is greater than an amount of minutiae of the registered fingerprint information, if the fingerprint image has a quality higher than a quality of the registered fingerprint information, and/or if the fingerprint image is obtained more recently than the registered fingerprint information.

In an embodiment, the method may further comprise obtaining a third touch input of the user to the display module 210 through the touch sensor 211, identifying whether the fingerprint image obtained through the fingerprint sensor 220 when the third touch input is obtained satisfies a second condition for fingerprint registration, identifying whether an intensity of the third touch input is greater than or equal to the threshold intensity, and registering the fingerprint image, based on identifying that the fingerprint image satisfies the second condition and that the intensity of the third touch input is greater than or equal to the threshold intensity.

In an embodiment, identifying whether the second condition is satisfied may comprise identifying that the second condition is satisfied, if an amount of minutiae of the fingerprint image is equal to or greater than a specified amount, and/or if a quality of the fingerprint image is equal to or higher than a specified quality.

The structure of data used in the above-described embodiments can be recorded on a computer-readable recording medium through various means. The computer-readable recording medium comprises storage media such as magnetic storage media (e.g., ROM, floppy disk, hard disk, etc.) and optical reading media (e.g., CD-ROM, digital versatile disc (DVD), etc.).

What is claimed is:

1. An electronic device comprising:
a fingerprint sensor;
a display comprising a touch sensor;
at least one processor including processing circuitry; and
memory storing instructions that, when executed by the at least one processor individually or collectively, cause the electronic device to:
obtain a first touch input of a user to the display through the touch sensor,
perform authentication for the user, based on a fingerprint image and registered fingerprint information, the fingerprint image being obtained through the fingerprint sensor when the first touch input is obtained,
identify, based on the authentication for the user being successful, whether the fingerprint image satisfies a first condition for updating the registered fingerprint information,
identify whether an intensity of the first touch input is greater than a threshold intensity set to determine whether a touch input to the display is inputted by the user's finger without a foreign object between the user's finger and the display, and
update the registered fingerprint information using the fingerprint image, based on identifying that the fingerprint image satisfies the first condition and the intensity of the first touch input is greater than the threshold intensity.

2. The electronic device of claim 1, wherein based on the fingerprint image not satisfying the first condition or the intensity of the first touch input being less than the threshold intensity, updating the registered fingerprint information using the fingerprint image is not performed.

3. The electronic device of claim 1, wherein the intensity of the first touch input is a maximum intensity among intensities of touch signals generated by the first touch input.

4. The electronic device of claim 1, wherein the instructions, when executed by the at least one processor individually or collectively, cause the electronic device to:
obtain a second touch input of the user to the display through the touch sensor,
identify an intensity of the second touch input,
obtain an average and a deviation of the intensity of the second touch input, and
set, based on the obtained average and deviation, the threshold intensity.

5. The electronic device of claim 4, wherein the instructions, when executed by the at least one processor individually or collectively, cause the electronic device to set, as the threshold intensity, an intensity greater than the intensity of a touch input inputted by the user's finger that is in contact with the foreign object and less than the average.

6. The electronic device of claim 4, further comprising a sensor,
wherein the instructions, when executed by the at least one processor individually or collectively, cause the electronic device to:
detect a state of the electronic device through the sensor when the second touch input is obtained,
map the state of the electronic device and the threshold intensity, and
store the mapped state of the electronic device and threshold intensity in the memory of the electronic device.

7. The electronic device of claim 6,
wherein the state of the electronic device includes at least one of a temperature of the electronic device, whether the electronic device is held by the user, or whether the electronic device is placed on an object.

8. The electronic device of claim 6, wherein the instructions, when executed by the at least one processor individually or collectively, cause the electronic device to identify that the fingerprint image satisfies the first condition, based on at least one of an amount of minutiae of the fingerprint image being greater than an amount of minutiae of the registered fingerprint information, the fingerprint image having a quality higher than a quality of the registered fingerprint information, or the fingerprint image being obtained more recently than the registered fingerprint information.

9. The electronic device of claim 1, wherein the instructions, when executed by the at least one processor individually or collectively, cause the electronic device to:
obtain a third touch input of the user to the display through the touch sensor,
identify, when the third touch input is obtained, whether the fingerprint image obtained through the fingerprint sensor satisfies a second condition for fingerprint registration,
identify whether an intensity of the third touch input is greater than the threshold intensity, and
register the fingerprint image, based on identifying that the fingerprint image satisfies the second condition and that the intensity of the third touch input is greater than the threshold intensity.

10. The electronic device of claim 9, wherein the instructions, when executed by the at least one processor individually or collectively, cause the electronic device to identify that the second condition is satisfied, based on at least one of an amount of minutiae of the fingerprint image being greater than a specified amount or a quality of the fingerprint image being higher than a specified quality.

11. A method for updating fingerprint information in an electronic device, the method comprising:
obtaining a first touch input of a user to a display of the electronic device through a touch sensor of the electronic device;
performing authentication for the user, based on a fingerprint image and registered fingerprint information, the fingerprint image being obtained through a fingerprint sensor of the electronic device when the first touch input is obtained;
identifying, based on the authentication for the user being successful, whether the fingerprint image satisfies a first condition for updating the registered fingerprint information;
identifying whether an intensity of the first touch input is greater than a threshold intensity set to determine whether a touch input to the display is inputted by the user's finger without a foreign object between the user's finger and the display; and
updating, based on identifying that the fingerprint image satisfies the first condition and the intensity of the first touch input is greater than the threshold intensity, the registered fingerprint information using the fingerprint image.

12. The method of claim 11, wherein, based on the fingerprint image not satisfying the first condition or the intensity of the first touch input being less than the threshold intensity, the updating of the registered fingerprint information using the fingerprint image is not performed.

13. The method of claim 11, wherein the intensity of the first touch input is a maximum intensity among intensities of touch signals generated by the first touch input.

14. The method of claim 11, further comprising:
obtaining a second touch input of the user to the display through the touch sensor;
identifying an intensity of the second touch input;
obtaining an average and a deviation of the intensity of the second touch input; and
setting, based on the obtained average and deviation, the threshold intensity.

15. The method of claim 14, wherein the setting of the threshold intensity comprises setting, as the threshold intensity, an intensity greater than the intensity of a touch input inputted by the user's finger that is in contact with the foreign object and less than the average.

16. The method of claim 14, further comprising:
detecting a state of the electronic device through a sensor of the electronic device when the second touch input is obtained;
mapping the state of the electronic device and the threshold intensity; and
storing the mapped state of the electronic device and threshold intensity in a memory of the electronic device.

17. The method of claim 16, wherein the state of the electronic device includes at least one of a temperature of the electronic device, whether the electronic device is held by the user, or whether the electronic device is placed on an object.

18. The method of claim 16, wherein the identifying of whether the fingerprint image satisfies the first condition comprises:

identifying that the fingerprint image satisfies the first condition, based on at least one of an amount of minutiae of the fingerprint image being greater than an amount of minutiae of the registered fingerprint information, the fingerprint image having a quality higher than a quality of the registered fingerprint information, or the fingerprint image being obtained more recently than the registered fingerprint information.

19. The method of claim 11, further comprising:

obtaining a third touch input of the user to the display through the touch sensor;

identifying whether the fingerprint image obtained through the fingerprint sensor when the third touch input is obtained satisfies a second condition for fingerprint registration;

identifying whether an intensity of the third touch input is greater than the threshold intensity; and registering the fingerprint image, based on identifying that the fingerprint image satisfies the second condition and that the intensity of the third touch input is greater than the threshold intensity.

20. The method of claim 19, wherein the identifying of whether the second condition is satisfied comprises identifying that the second condition is satisfied, based on at least one of an amount of minutiae of the fingerprint image being greater than a specified amount, or a quality of the fingerprint image being higher than a specified quality.

* * * * *